F. T. BAIRD.

BATTERY AND SEPARATOR THEREFOR.

APPLICATION FILED AUG. 30, 1920.

Reissued Mar. 22, 1921. 15,067.

Inventor:
Frank T. Baird,

By Cheever & Cox attys.

UNITED STATES PATENT OFFICE.

FRANK T. BAIRD, OF BLUE ISLAND, ILLINOIS.

BATTERY AND SEPARATOR THEREFOR.

15,067. Specification of Reissued Letters Patent. Reissued Mar. 22, 1921.

Original No. 1,279,074, dated September 17, 1918, Serial No. 202,720, filed November 19, 1917. Application for reissue filed August 30, 1920. Serial No. 407,048.

*To all whom it may concern:*

Be it known that I, FRANK T. BAIRD, a citizen of the United States, residing at Blue Island, in the county of Cook and State of Illinois, have invented a certain new and useful Battery and Separator Therefor, of which the following is a specification.

My invention relates to separators for storage batteries. Various characteristics are desirable in a separator, for example, it is desirable that it shall be highly permeable to the electrolyte. This, among other things, gives low internal resistance to the battery. It is desirable that it shall have high absorptive properties, thus enabling it, when used in a dry battery, to retain in itself a sufficient quantity of the electrolyte to enable the battery to function efficiently and to prevent the liquid from running out in case the cell is overturned or punctured. It is desirable that it shall be porous so that it may be readily washed. It is desirable that it shall be soft enough not to injure the battery plates nor tend to remove the active material from them. It is desirable also that it shall be simple to manufacture, inexpensive, and made from material easy to obtain. I have discovered that a separator combining the mentioned characteristics may be obtained by making it of tripoli as will be explained.

While the separator and battery in which it is used may assume various forms, I have illustrated a suitable one in the accompanying drawings, in which.

In the drawings, similar parts are indicated by similar reference characters in the several views.

Figure 1:
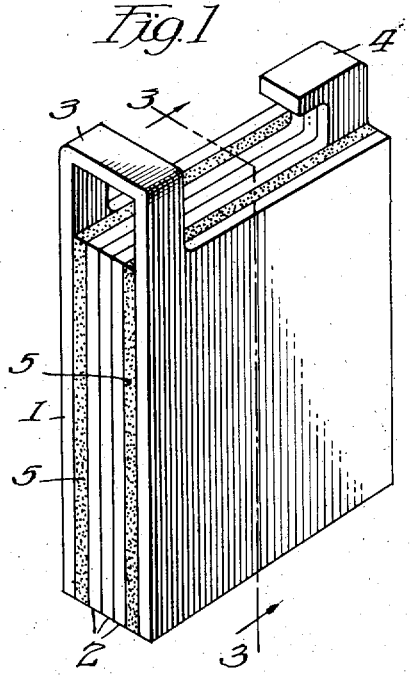
Figure 1 is a perspective view of the positive and negative plates of a battery showing my separators in position.
Figure 3:
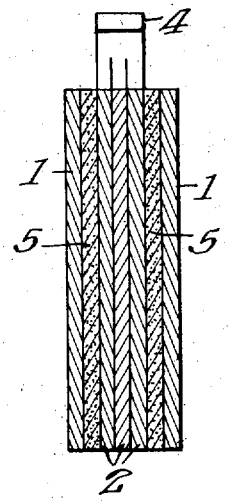
Fig. 3 is a sectional view taken on the line 3, 3, Fig. 1.
Figure 2:
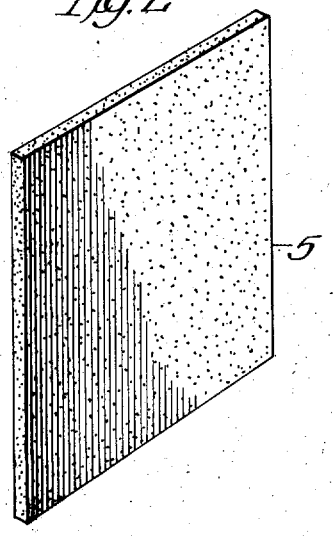
Fig. 2 is a perspective view of the form of separator used in this particular type of battery.

To describe the particular style of battery shown in the drawings: The outer plates 1, 1 are negative and the inner ones 2 positive. These consist usually of lead having suitable active material upon their surfaces. The negative plates are connected by a lug 3 and the positive plates are here shown to be formed in three layers, connected by a lug 4. The separators 5 are interposed between the positive and negative plates and, by preference, are substantially equal to them in size. They are composed of a material technically known as "tripoli" which is defined as a siliceous deposit almost wholly of the shells of diatoms and occurring in friable masses or earthy form. I have discovered that this material is capable of absorbing sufficient electrolyte to permit portable batteries to discharge effectively for as long a period as can be expected from most commercial dry cells in which the electrolytic liquid is present in such quantities that it will run out in case any opening is made in the shell or jacket. In other words, a battery using my separators does not contain electrolyte which is free in the sense of being able to be drained off in case of puncture. The electrolyte is present in adequate quantity but is held absorbed by the separators.

My separators are usually formed by sawing them from masses of tripoli in the native state. No treatment of any kind is ordinarily required. The tripoli itself is found in large quanties in Missouri and other States of the United States in a very pure state and exhibiting the characteristics which are so valuable and which render my battery so efficient.

It is well known that in the ordinary dry battery, as soon as the electrolyte liquid has been drained off, the battery loses its efficiency, if not most of its ability to function at all. In a battery employing my separator on the contrary, the cell will continue to function as long as may be expected from any so-called "dry" cell. I have discovered, furthermore, that tripoli has such porosity as to present very low resistance, the result being that a battery employing this material as a separator has low internal resistance. I have also discovered that after the battery has been apparently discharged (so far as ordinary practical conditions are concerned) and the voltage has dropped to about 1.5 volts, a considerable added period of service may be obtained by pouring fresh water upon the separators; for example, when the battery has discharged to about 1.5 volts, by removing the separators and pouring fresh (preferably distilled) water upon them and reassembling the battery, an additional service of one and one-half hours may be obtained from a small portable battery without recharge.

The effect of the ordinary electrolyte upon the tripoli separator seems to be to soften the surface. Such a separator, therefore, is easy upon the battery plates in the sense that it does not abrade the plates or tend to remove the active material from their faces. The plates themselves, therefore, last much longer with my separators than with others having harder or more abrasive surfaces.

Batteries constructed in the manner described and employing separators of tripoli may be recharged by connecting them in a charging circuit in the same manner as is employed in the recharging of wet batteries. I have found that the constituency of tripoli is such that it distributes the electrolyte over the entire area of the separator, thus making for efficiency in the battery. As a result of my invention or discovery, I am able to produce a battery and separator easily and cheaply from materials which occur abundantly close at hand in a state of nature. I am also able to procure a battery which will not leak or drip in case the shell or casing is punctured or inverted, and will recuperate for an additional period of service by merely washing the separators or permitting fresh water to flow upon them. The internal resistance is held at a low point and distribution of the electrolyte throughout the area of the separator is uniform, owing, I believe, to the capillary characteristics of the material.

Having thus described my invention what I claim as new and desire to secure by Letters Patent, is:—

1. A battery separator formed of tripoli.

2. A separator for storage batteries formed by sawing tripoli in its native state into slabs or sheets.

3. A recharge dry battery whose electrolyte is absorbed by the separators, substantially completely, and whose plates have active material whereby the battery may be recharged.

4. A secondary battery having separator plates of sufficient absorptive capacity to retain all the electrolyte required for charging and discharging.

5. A storage battery having positive and negative plates and separators of porous and absorptive character having an absorptive capacity sufficient to enable them to absorb enough electrolyte to render the battery operative, the plates having active material upon their surfaces whereby the battery may be recharged.

In witness whereof, I have hereunto subscribed my name in the presence of two witnesses.

FRANK T. BAIRD.

Witnesses:

DWIGHT B. CHEEVER,
ANNA ROSENTHAL.